(12) United States Patent
Floyd et al.

(10) Patent No.: US 7,899,700 B2
(45) Date of Patent: Mar. 1, 2011

(54) METHOD AND SYSTEM FOR PROVIDING MULTI-DIMENSIONAL FEEDBACK

(75) Inventors: Michel Floyd, Redwood City, CA (US); Tim Biglow, Los Altos, CA (US); Thomas Subias, Mountain View, CA (US); Thom Bishop, Pacifica, CA (US); Danielle Murray, Millbrae, CA (US)

(73) Assignee: Knowledge Networks, Inc., Menlo Park, CA (US)

( * ) Notice: Subject to any disclaimer, the term of this patent is extended or adjusted under 35 U.S.C. 154(b) by 1161 days.

(21) Appl. No.: 11/541,330

(22) Filed: Sep. 29, 2006

(65) Prior Publication Data

US 2008/0082394 A1    Apr. 3, 2008

(51) Int. Cl.
*G06F 17/60*    (2006.01)
(52) U.S. Cl. ......................................... 705/10
(58) Field of Classification Search ............ 705/10
See application file for complete search history.

(56) References Cited

U.S. PATENT DOCUMENTS

| | | | |
|---|---|---|---|
| 5,754,787 A | 5/1998 | Dedrick | |
| 5,893,098 A * | 4/1999 | Peters et al. | 705/10 |
| 6,029,195 A * | 2/2000 | Herz | 725/116 |
| 6,064,980 A | 5/2000 | Jacobi et al. | |
| 6,070,145 A | 5/2000 | Pinsley et al. | |
| 6,098,048 A | 8/2000 | Dashefsky et al. | |
| 6,112,181 A | 8/2000 | Shear et al. | |
| 6,385,693 B1 | 5/2002 | Gerszberg et al. | |
| 6,397,212 B1 * | 5/2002 | Biffar | 707/704 |
| 6,477,504 B1 * | 11/2002 | Hamlin et al. | 705/10 |
| 6,513,014 B1 | 1/2003 | Walker et al. | |
| 6,532,458 B1 | 3/2003 | Chaudhuri et al. | |
| 6,539,392 B1 * | 3/2003 | Rebane | 705/10 |
| 6,542,886 B1 | 4/2003 | Chaudhuri et al. | |
| 6,571,216 B1 | 5/2003 | Garg et al. | |
| 6,697,824 B1 | 2/2004 | Bowman-Amuah | |
| 6,754,635 B1 | 6/2004 | Hamlin et al. | |
| 6,760,916 B2 | 7/2004 | Holtz et al. | |
| 6,772,139 B1 | 8/2004 | Smith, III | |
| 6,778,807 B1 | 8/2004 | Martino et al. | |
| 6,912,521 B2 * | 6/2005 | Kraft et al. | 1/1 |
| 6,999,987 B1 | 2/2006 | Billingsley et al. | |
| 7,054,828 B2 | 5/2006 | Heching et al. | |
| 7,233,908 B1 * | 6/2007 | Nelson | 705/10 |
| 7,269,570 B2 | 9/2007 | Krotki | |
| 7,343,417 B2 | 3/2008 | Baum | |
| 7,418,496 B2 * | 8/2008 | Macey et al. | 709/224 |
| 7,788,212 B2 * | 8/2010 | Beckmann et al. | 705/26 |
| 2001/0034647 A1 | 10/2001 | Marks et al. | |

(Continued)

OTHER PUBLICATIONS

"A Brief Introduction to Sampling", http://web.archive.org/web/19990220032218/http://pyschology.ucdavis.edu/rainbow/html/Fact_sample.html, Mar. 4, 2005, pp. 1-7.

(Continued)

*Primary Examiner* — Romain Jeanty

(57) ABSTRACT

A method and system for receiving multi-dimensional feedback in a survey comprises a participant interface module and a data analysis module. The participant interface module comprises a display of a media and a plurality of interactive indicators. Each of the plurality of interactive indicators can receive feedback from at least one participant according to a dimension and a time of the feedback. The data analysis module receives and processes the feedback to generate a result which may be graphically displayed. The result may comprise the processed feedback with the media according to the two or more dimensions and the time of the feedback.

20 Claims, 12 Drawing Sheets

U.S. PATENT DOCUMENTS

| | | | |
|---|---|---|---|
| 2002/0016731 | A1 | 2/2002 | Kupersmit |
| 2002/0038302 | A1 | 3/2002 | Maeda |
| 2002/0052774 | A1* | 5/2002 | Parker et al. .................... 705/10 |
| 2002/0128898 | A1 | 9/2002 | Smith, Jr. et al. |
| 2003/0002490 | A1 | 1/2003 | Wong et al. |
| 2003/0014320 | A1 | 1/2003 | Thompson et al. |
| 2003/0088458 | A1 | 5/2003 | Afeyan et al. |
| 2003/0144899 | A1 | 7/2003 | Kokubo |
| 2004/0133463 | A1 | 7/2004 | Benderev |
| 2006/0155513 | A1 | 7/2006 | Mizrahi et al. |

OTHER PUBLICATIONS

"Regional Sampling Methods/Environmental Sampling and Monitoring Primer", Heidi Christopher and Dottie Schmitt, http://ewr.cee.vt.edu/environmental/teach/smprimer/design/sample.html, Dec. 6, 2006, pp. 1-5.

Decision Analyst, Inc. Marketing Research and Consulting Services, http://web.archive.org/web/19991012125037/decisionanalyst.com/servindex.htm, Mar. 4, 2005, pp. 1-15.

"The Organization Health Report: An HR Metric to Mobilize Executives into Action", Joseph S. Fiorelli, Gretchen A. Alarcon, and Eileen Taylor, Kelly Human Resource Planning, vol. 21, No. 2, pp. 12-19, 1998, from Dialog File 15, Item 2, 2005.

"InterSurvey is Providing Polls on 2000 Election", Knowledge Networks, Inc. press release, http://www.knowledgenetworks.com, Dec. 14, 1999, pp. 1-4.

"OnPolitics—What Americans Think: Lights out for Traditional Polls?", Richard Morin, Washington Post, http://www.washingtonpost.com/wp-srv/politics/polls/wat/archive/wat051500.htm, May 15, 2000, pp. 1-3.

"Probability Definitions: Example # 1", http://web.archive.org/web/20001209052000/http://stat.wvu.edu/SRS/Modules/ProbDef/urn...html, Dec. 9, 2000, Nov. 18, 2005, pp. 1-2.

"Web Surveys, The Sequel", Allan Rivlin, National Journal, Oct. 20, 1999, http://www.knowledgenetworks.com, pp. 1-4.

"Sampling With Replacement and Sampling Without Replacement", http://www.web.archive.org/web/19990823060052/http://www.ma.utexas.edu/users/parker/sampling/repl.htm, Mar. 4, 2005.

"To Politically Connect, and Profitably Collect", Sarah Schafer, Washington Post, Dec. 13, 1999, http://www.knowledgenetworks.com, pp. 1-6.

"Listening to the Voice of the Employee", Ronald D. Snee, Quality Progress, vol. 28, Jan. 1995, pp. 91-95, from Dialog File 15, Item 3, 2005.

"Survey Sampling Methods", http://www.web.archive.org/web/20001003145831/http://www.statpac.com/surveys/sampling.htm, Dec. 6, 2006, pp. 1-2.

"Conducting a Survey", Paul White, http://www.cems.uwe.ac.uk/'pwhite/SURVEY2/nodel.html, Dec. 6, 2006, pp. 1-4.

"SUDAAN 7: Statistical Analysis Software for Complex Sample Designs", Robert A. Yaffee, http://www.nyu.edu/its/pubs/connect/archives/97summer/yaffeesudaan.html, Nov. 18, 2005, pp. 1-3.

* cited by examiner

US 7,899,700 B2

METHOD AND SYSTEM FOR PROVIDING MULTI-DIMENSIONAL FEEDBACK

BACKGROUND OF THE INVENTION

1. Field of the Invention

The present invention relates generally to consumer surveys, and more particularly to providing multi-dimensional feedback in a consumer survey.

2. Description of the Related Art

Surveys, polls, questionnaires, and the like are a valuable tool used by entities, such as marketers, politicians, and interest groups, to predict success of a media. Media may comprise, for example, a movie, an advertising campaign, a political speech, or a television program. The surveys may be presented to an audience including a focus group, a panel, or a group of survey participants selected as a random sample or according to a target demographic profile. In one current method used to collect feedback, a media is displayed to the audience. Subsequently, a series of questions to elicit responses or reactions from the audience is asked. The feedback may also be collected at selected times during the display of the media. However, data collected at the end of the display or during a section of the display tends to be vague or unreliable as it measures the audience's general reactions to the entire display of the media or sections of the media.

Therefore there is a need for a system and method for collecting continuous, multi-dimensional feedback. There is also a need for a system and method for displaying the continuous feedback results.

SUMMARY OF THE INVENTION

An exemplary system for receiving multi-dimensional feedback in a survey comprises a participant interface module and a data analysis module. The participant interface module controls a display of a media and a plurality of interactive indicators configured to receive feedback from at least one participant. The feedback is based on two or more dimensions and a time of the feedback. The data analysis module receives and processes the feedback to generate a result which may be graphically displayed. The result may comprise the processed feedback with the media according to the two or more dimensions and the time of the feedback.

The exemplary system may further comprise a media set-up module that provides a graphical user interface to an operator associated with the media. The operator may specify the two or more dimensions. The operator also may specify targeted demographics for the survey. Based on the targeted demographics, a participant database comprising profiles associated of survey participants are reviewed. Selected survey participants may then be invited to participate in the survey.

The exemplary method comprises providing a media and a plurality of interactive indicators to at least one participant. The participant may be chosen based on their demographics matching those that a survey provider is seeking. In some embodiments, an invitation to sent to the participant inviting them to participate in the survey.

Feedback from the at least one participant is received via a plurality of interactive indicators. These interactive indicators provide a plurality of dimensional feedback and a time of the feedback. The feedback may also comprise open-ended comments. In some embodiments, the feedback may be weighted by a data aggregator before being analyzed by the analyzer engine.

An exemplary result of the analyzed feedback comprises a media shown concurrently with the feedback results. This allows the survey provider to view the feedback results in a visual and temporal context of the media.

DETAILED DESCRIPTION OF EXEMPLARY EMBODIMENTS

Embodiments of the present invention provide systems and methods for collecting substantially continuous survey data comprising multiple dimensions and providing a display of the results of the survey in a convenient and easy to understand format. A dimension is a specified characteristic of the media about which a survey participant provides feedback. Exemplary embodiments allow media providers to customize survey dimensions based on types of desired feedback. Advantageously, survey participants are able to provide feedback concurrently with a media display, resulting in more detailed and accurate survey feedback. In further embodiments, results of the survey may be displayed alongside the media that was presented to the survey participants. This allows the media provider to more easily visually analyze the results in the context of the media.

Unlike, prior art systems, the survey participant is able to choose when to provide detailed feedback on a continuous basis during the media display. As a result, the feedback collected is more accurate and useful to the media provider in determining which portions of the media should be changed.

Figure 1:
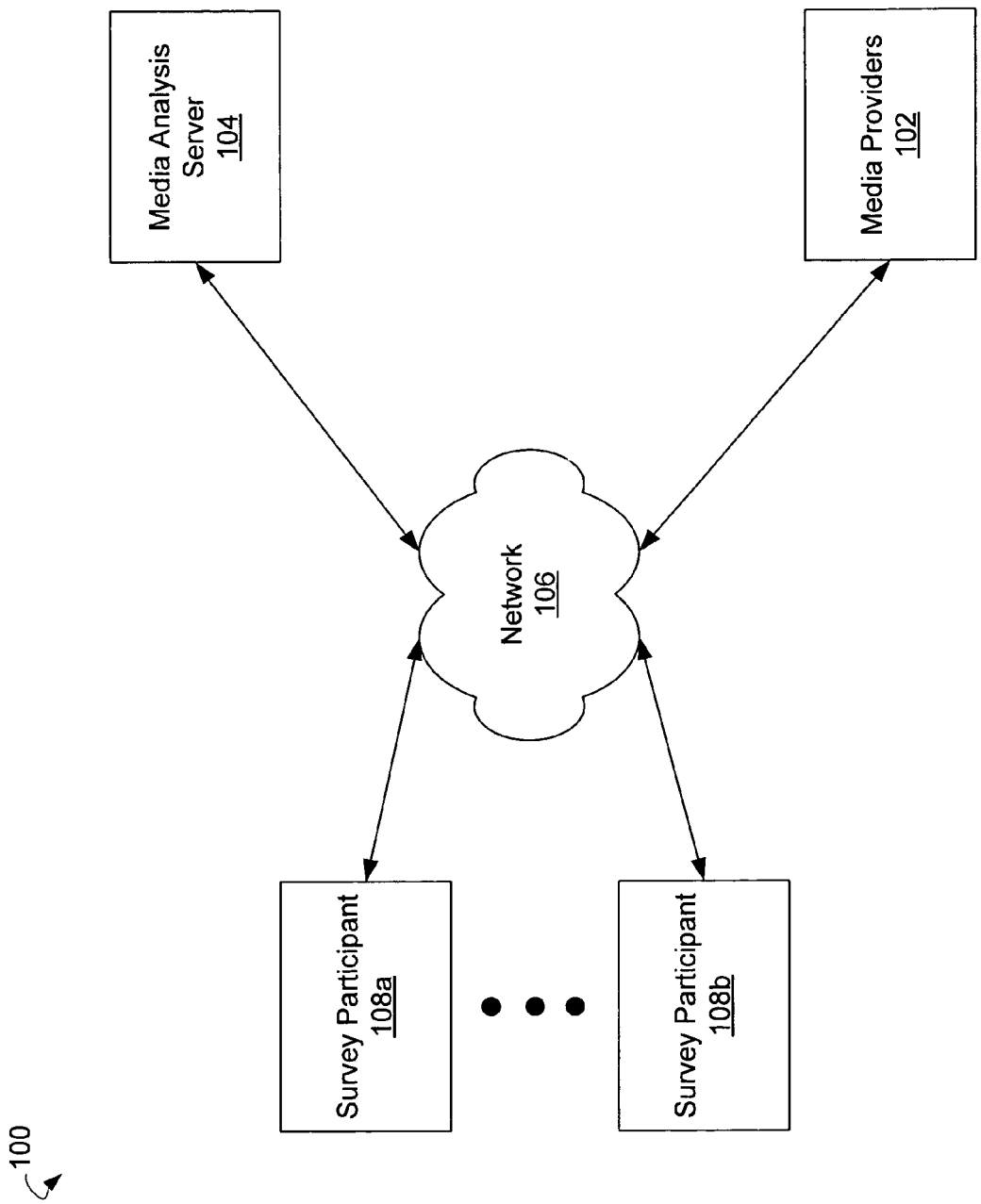
FIG. 1 depicts an online environment in which embodiments of the present invention may be practiced.

FIG. 1 depicts an online environment 100 in which embodiments of the present invention may be practiced. The exemplary environment 100 comprises a media provider 102, a media analysis server 104, a network 106, and one or more survey participants 108. In some embodiments, the network 106 may comprise a public network (e.g., the Internet) or a private network (e.g., a local area network).

The present embodiment allows a media provider 102 to create a customized survey about a media at the media analysis server 104. The survey participants 108 then electronically view the customized survey over the network 106 and provide detailed feedback. The feedback is transmitted back to the media analysis server 104 which processes the feedback to create a results presentation for the media provider 102.

The media may be generated by the media provider 102. In some embodiments, the media may comprise, for example, a movie, a political speech, a television program, an advertisement such as a television commercial, or Internet programming such as a Podcast®. The media provider 102 may comprise a marketing firm, an advertiser, a film or television studio, a political candidate, an interest group, or the like.

In exemplary embodiments, the media analysis server 104 receives the media and at least a portion of survey set-up data from the media provider 102. Alternatively, the media analysis server 104 generates all or part of the survey set-up data. Additionally, the media analysis server 104 determines which users to select and invites the selected users to participate in the survey as survey participants 108. The media analysis server 104 also receives and processes the feedback from the survey participants 108. The media analysis server 104 is discussed in greater detail in connection with FIG. 2 and FIG. 3.

During the survey, the media may be displayed on a computing device coupled to the network 106 at the survey participant's 108 location via a survey interface, such as the survey interface described in connection with FIG. 8 and FIG. 9. The survey interface may be implemented on the computing device using an interactive applet, a Java® module, a Macromedia® Flash file, or the like. In exemplary embodiments, each survey participant 108 is categorized according to demographic, attitudinal, and/or behavioral profiles.

It should be noted that the environment 100 may comprise more or fewer components. Further, the environment 100 may include any number of media providers 102, media analysis servers 104, and survey participants 108. The environment 100 may further comprise components not relevant to the functionalities of the embodiments of the present invention.

Figure 2:
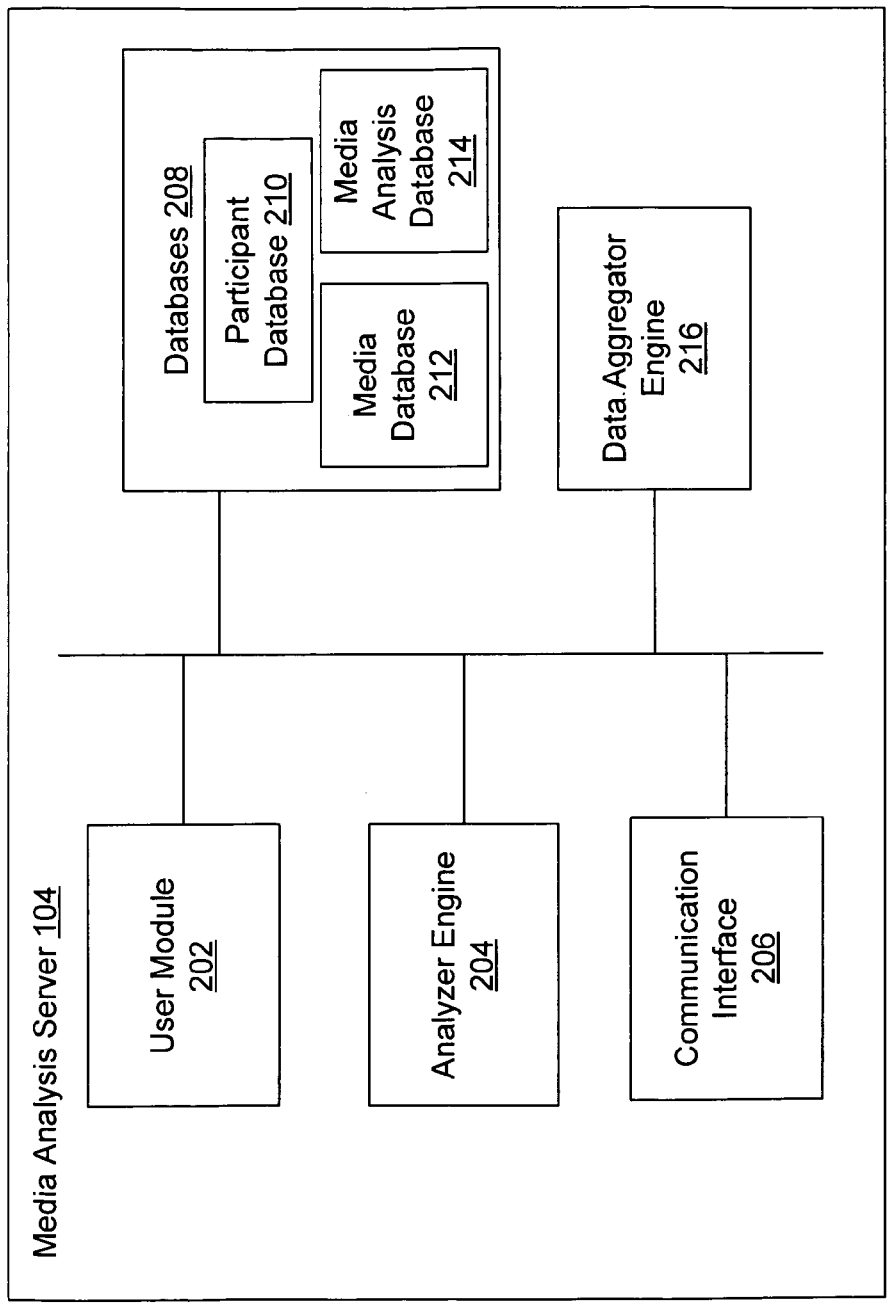
FIG. 2 depicts a block diagram of an exemplary media analysis server.

FIG. 2 depicts a block diagram of the exemplary media analysis server 104 used in various embodiments of the present invention. In one embodiment, the media analysis server 104 comprises a user module 202, an analyzer engine 204, a communication interface 206, one or more databases 208, and a data aggregator engine 216.

The user module 202 is configured to set-up and maintain a user profile about the survey participant 108. The user profile may be based on data received from the user or input via a survey or other method. The user profile may include demographic information, preferences, and/or contact information. The user module 202 is configured to collect the data comprising the user profile and store the data in the databases 208. In some embodiments, the user module 202 is configured to review the user profile in order to determine whether to send an invitation to participate in a survey to the user.

In some embodiments, the analyzer engine 204 generates communications to, and processes communications from, the media providers 102 and the survey participants 108. The analyzer engine 204 may analyze feedback received from the survey participants 108 and generate a results presentation for the media provider 102. The analyzer engine 204 is discussed in greater detail in connection with FIG. 3.

The communication interface 206 is configured to provide communications to and from the media provider 102 and the survey participants 108. In some embodiments, the communication interface 206 is configured to receive input from an operator (e.g., media provider 102) to set-up a survey and to provide survey results. The communication interface 206 also communicates with the survey participants 108 to provide the survey and receive the corresponding feedback.

The exemplary databases 208 may comprise a participant database 210, a media database 212 and/or a media analysis database 214. In exemplary embodiments, the databases 208 may be located within the media analysis server 104. In alternative embodiments, the databases 208 are located outside of the media analysis server 104 and coupled to the media analysis server 104. The participant database 210 comprises data relating to survey participants 108. This data may include demographic data such as age, location, gender, income level, hobbies, interests, and the like. This data may be gathered from the survey participants 108 based on surveys, questionnaires, purchasing habits, geographic location. The survey participants 108 may provide this data on a periodic basis and/or the data may be continuously collected.

The exemplary media database 212 stores media received from the media providers 102. The stored media are the media that the media provider 102 desires feedback about from the survey participants 108. The media may comprise multiple versions, translations, or adaptations. Corresponding set-up data associated with the media may also be stored with the media in the media database. The set-up data may comprise desired demographics, dimensions to be analyzed, whether to include a general feedback mode, whether to allow open-ended comments, when the survey is terminated, and the like.

The exemplary media analysis database 214 stores data received as feedback from the survey participants 108. The media analysis database 214 may additionally include data resulting from processing and analyzing the feedback. Other examples of databases that may be included in the databases 208 will be apparent to those skilled in the art.

In exemplary embodiments, the data aggregator engine 216 aggregates and weights feedback received from the survey participants 108 prior to the feedback being analyzed by a data analysis module 306 in the analyzer engine 204. To simplify the analysis of the data, the feedback may be aggregated according to a time of receipt of the feedback and/or a particular dimension. Optionally and additionally, the data aggregator engine 216 may weight feedback received from a survey participant 108 to allow the feedback to be interpreted correctly as being representative of the target population.

In some embodiments, the data aggregator engine 216 may weight the demographics of the survey participants 108 that have provided feedback and communicate with the user module 202 to achieve a representative population. For example, if a maximum amount of feedback has been provided by males between the ages of 18-25, the data aggregator may stop collecting feedback from this group and instruct the user module 202 to send survey termination messages to invitees who are members of this group and have not yet provided feedback. Alternatively, the data aggregator engine 216 may instruct the user module 202 to send out additional invitations to participate in the survey if fewer responses have been received from a particular demographic. For example, if an insufficient number of women between the ages of 13-18 have provided feedback, the data aggregator engine 216 instructs the user module 202 to send out additional invitations to participate in the survey to other users in this demographic profile.

Figure 3:
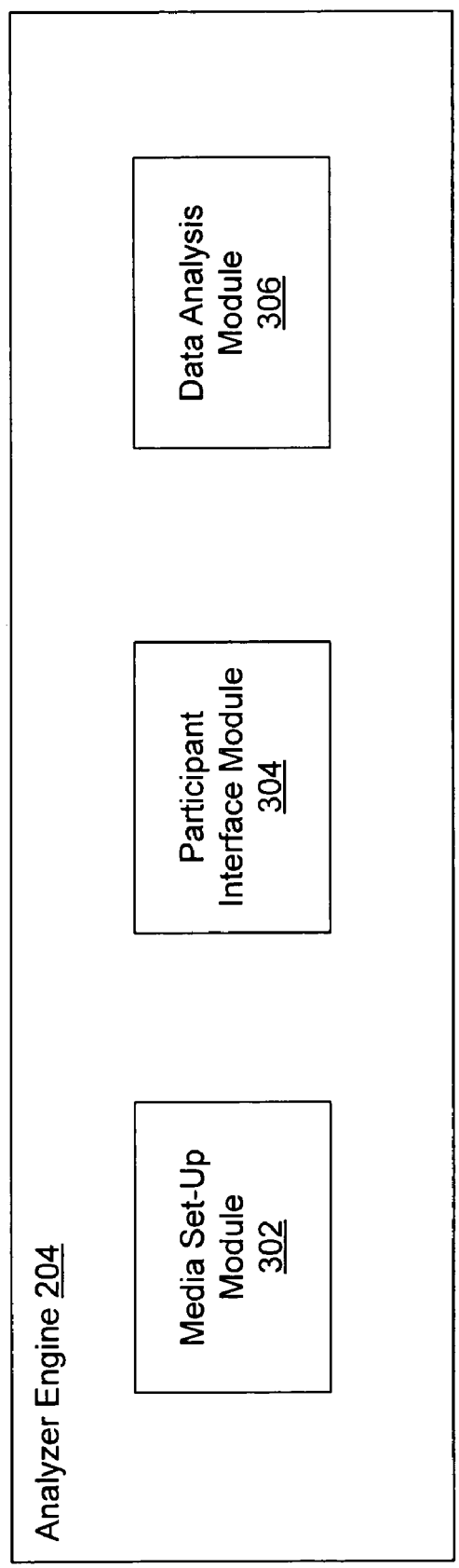
FIG. 3 depicts a block diagram of an exemplary analyzer engine.

FIG. 3 depicts a block diagram of the exemplary analyzer engine 204. The analyzer engine 204 is configured to manage the survey and the feedback. In some embodiments, the analyzer engine 204 comprises a media set-up module 302, a participant interface module 304, and a data analysis module 306.

In exemplary embodiments, the media set-up module 302 provides a graphical user interface to the media provider 102 to set-up the survey. The graphical user interface may include options to provide or select the media, or a version of the media, to be displayed to the survey participants 108 and to specify at least one dimension to be measured in the survey. Additional options that may be included in the media set-up module 302 include an option to provide the survey participants 108 the ability to input open-ended comments and/or a menu to select a target audience to be invited to participate in the survey. The target audience may then be invited to participate based on their demographic, attitudinal, or behavioral profile. The graphical user interface is discussed is more detail in connection with FIG. 5 and FIG. 7.

In exemplary embodiments, the participant interface module 304 provides a graphical user interface for the survey participants 108 to view the media and input their feedback. In one embodiment, the user interface may comprise an applet executable on a computing device at the survey participants' 108 location. In other embodiments, the user interface may be downloaded and/or executed as a Java® script or as a Macromedia® Flash file. The participant interface module 304 is discussed in greater detail in connection with FIG. 8 and FIG. 9.

To execute graphical user interfaces at the media providers 102 or the survey participants 108, the analyzer engine 204 may further comprise a download module (not shown). The download module is configured to transmit the applet or other executable code to the media provider 102 and/or the survey participants 108 to provide the appropriate graphical user interface. In some embodiments, the applet may be customized to the type of media or to the demographic, attitudinal, or behavioral profile of a survey participant 108.

The analyzer engine 204 may further comprise a data analysis module 306. In an embodiment comprising the data aggregator engine 216, the data analysis module 306 receives the feedback from the data aggregator engine 216 and processes the feedback. In an embodiment without the data aggregator module 216, the data analysis module 306 may receive the feedback directly from the survey participants 108 or a database 208. In this embodiment, the data analysis module 306 may comprise the functionalities of the data aggregator module 216. The processing may include coordinating time of the feedback, statistical analysis of the feedback, and compiling open-ended comments.

In some embodiments, the data analysis module 306 generates a results presentation. The results presentation presents the aggregated and analyzed feedback received from the survey participants 108 to the media provider 102. The results presentation may include the version of the media displayed or a link to the version stored in the media database 212 in conjunction with the feedback results.

Figure 4:
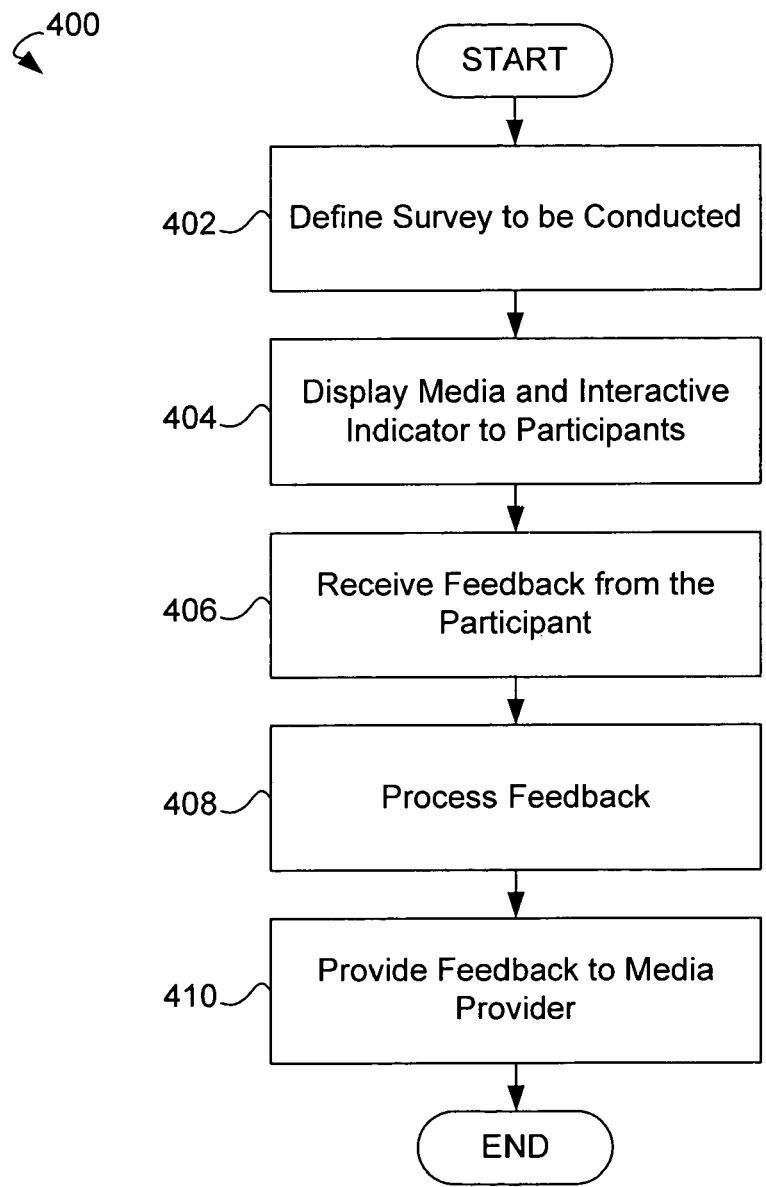
FIG. 4 depicts a flowchart of a method used to collect and display multi-dimensional feedback according to various embodiments of the invention.

FIG. 4 depicts a flowchart 400 of an exemplary method used to collect and present multi-dimensional feedback. The flowchart 400 provides a method for setting up a survey according to multiple dimensions, transmitting the survey to one or more survey participants 108 according to specific profiles, and presenting the results to the media provider 102. Advantageously, the flowchart 400 permits a collection of feedback that is more focused and accurate.

In step 402, an operator at the media-analysis server 104 and/or the media provider 102 sets-up the survey to be conducted. The set-up can depend on a type of media, a selected audience, and needs of the media provider 102. The set-up may include selecting a target audience. The set-up process is discussed in greater detail in the discussion of FIG. 5.

In step 404, after the survey is set-up, the media is displayed with at least one interactive indicator to the selected survey participants 108. In one embodiment, the communication interface 206 sends an email to the selected survey participants 108 that comprises a link to a website through which the survey is accessible. In alternative embodiments, a survey participant 108 may periodically (e.g., once a week) visit a website hosted by the media analysis server 104 where surveys are posted. The survey invitation may include a password or security mechanism that is required to access the survey.

The survey, comprising the media and the interactive indicators, may be transmitted via the network 106 from the media provider 102 and/or the media analysis server 104. The survey participants 108 submit ratings using interactive indicators or open-ended comments in step 406. The term "ratings" refers specifically to the quantifiable feedback received via the interactive indicators for each dimension. The quantifiable feedback, which may or may not be provided from the survey participant 108 as a discrete number (e.g., the survey participant 108 provides a location on a slider), may be expressed numerically for the purposes of data aggregation and/or analysis. Steps 404 and 406 may occur in serial, simultaneously, or iteratively, and are discussed in greater detail in connection with FIG. 6.

In step 408, the media analysis server 104 processes the feedback received from the survey participants 108 to generate a results presentation. The media analysis server 104 may begin processing the feedback when a specified number of responses have been received or a specified time period has elapsed. The feedback processing will be discussed in greater detail in the discussion of FIG. 7.

In step 410, the results of the survey as calculated by the data analysis module 306 are displayed in a results presentation to the media providers 102. In one embodiment, the results presentation comprises a display of the media and one or more animated indicators. The animated indicators may indicate aggregated feedback received from the survey participants 108, such as density of open-ended comments or the statistical results calculated based on the quantifiable ratings received. The media is displayed such that the media display is synchronized with the time of the feedback. For example, feedback associated with the fifteenth second of the media is displayed while the fifteenth second of the media is displayed. Thus the media provider 102 can review the results of the survey at a point in time when the feedback is provided. In some embodiments, the operator at the media provider 102 is able to control (e.g., start, stop, rewind, or fast-forward) the playback of the results presentation via a user interface.

Figure 5:
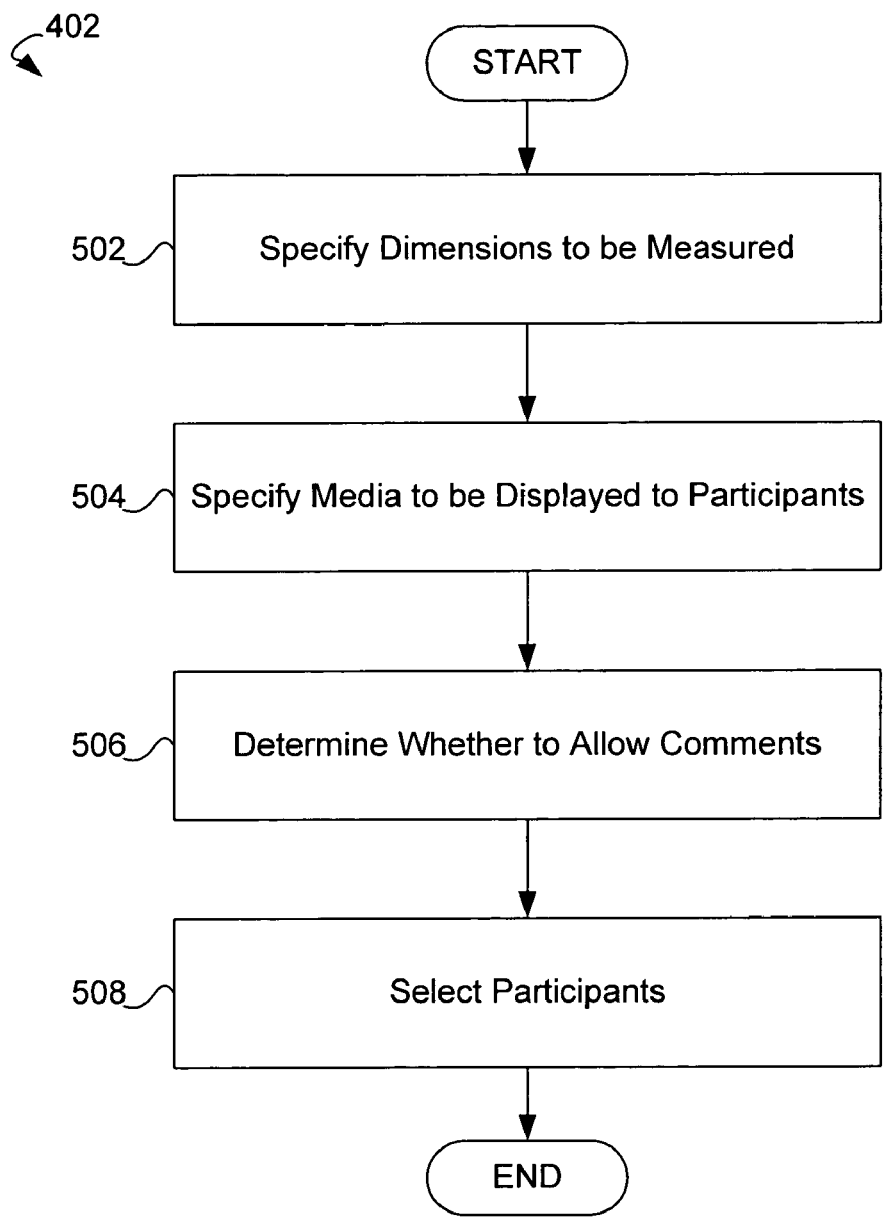
FIG. 5 depicts a flowchart of the process used to set-up a survey according to various embodiments of the invention.

Referring now to FIG. 5, a flowchart 402 of an exemplary process used to set-up a survey is shown. The process permits the media provider 102 and/or the media analysis server 104 to dictate the contents of the survey and elicit specific types of feedback.

In step 502, the media provider 102 and/or an operator of the media analysis server 104 specifies dimensions to be measured by the survey. In some embodiments, the dimensions may be selected from a menu or created by an operator. The menu may include popular or frequently used default dimensions. Default dimensions appearing in a menu may additionally be categorized based on the type of the media. For example, if the media is a movie, the default dimensions may include exciting/boring, funny/not funny, and fast-moving/dragging. In contrast, if the media is a political speech the default dimensions may include dimensions such as credible/not credible, persuasive/unpersuasive, charismatic/uncharismatic, and partisan/non-partisan.

The dimensions to be measured may be bipolar and measured according to a scale or later quantified (e.g., from negative five to positive five or from zero to ten). Other scales will be apparent and may not include a numerical equivalent (e.g., a color scale).

In step 504, the media to be displayed to the participants as part of the survey is specified. The media provider 102 may therefore conduct surveys on separate media or slightly different versions of the same media. In further embodiments, different versions of the media may be displayed to different demographic groups.

In step 506, the media provider 102 or operator determines whether to allow open-ended comments during the display. In embodiments where open-ended comments are allowed, a survey participant 108 is able to enter a comment in a text field at any point during the survey. The open-ended comment permits a survey participant 108 to provide unstructured feedback relating to the media.

In step 508, the survey participants 108 are selected. For example, the media provider 102 may desire to survey a specific demographic, attitudinal, or behavioral profile (e.g., men between the ages of 18 and 25). The media analysis server 104 may then receive this selection, and based on the profiles of survey participants 108 in the participant database 210, may transmit a survey invitation to only the survey participants 108 who fit this demographic, attitudinal, or behavioral profile. Alternatively, the media provider 102 may select a random sample to be selected from the participant database 210. It should be noted that steps 502, 504, 506, and 508 can be performed simultaneously or in any order. Additionally, some of the steps may be performed at the media analysis server 104 while others may be performed at the media provider 102.

Figure 6:
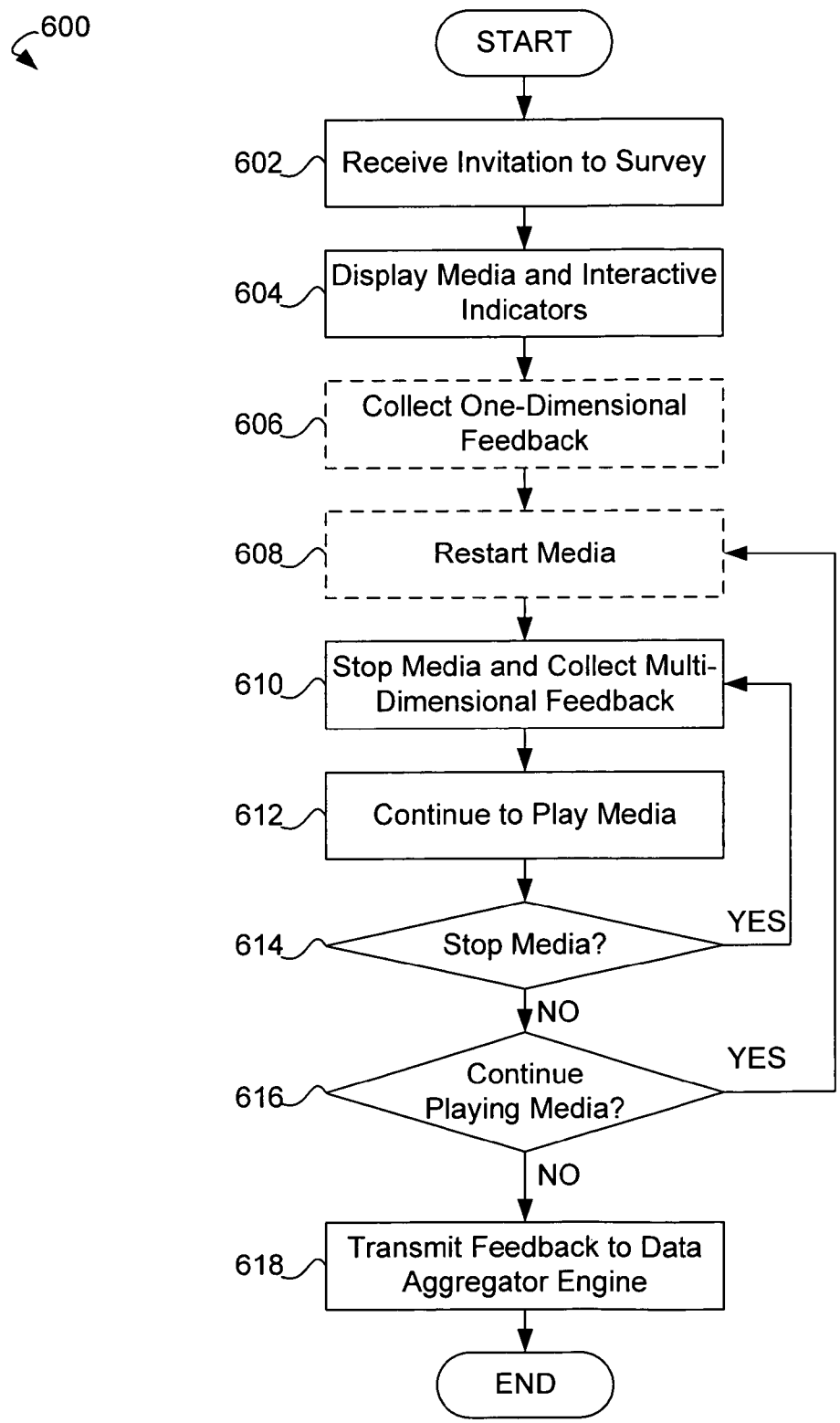
FIG. 6 depicts a flowchart illustrating a feedback process performed by the participant according to one embodiment of the invention.

FIG. 6 depicts a flowchart 600 illustrating an exemplary feedback method performed by the participant 108 according to exemplary embodiments of the present invention. This feedback method allows the survey participants 108a and 108b to respond continuously to media being displayed according to one or more dimensions.

In step 602, the selected survey participant 108 receives an invitation to participate in the survey from the media analysis server 104. The invitation may be, for example, an e-mail message. In exemplary embodiments, the invitation may be based on a demographic, attitudinal, or behavioral profile or a random sample of the population, as discussed herein.

In step 604, the media analysis server 104 displays the survey comprising the media and the interactive indicators to the survey participants 108. The survey may be conducted over the network 106 or downloaded by the survey participants 108 to their computing device. The survey may additionally comprise one or more playback controls such as stop, play, pause, rewind, or fast forward that can be used by the survey participants 108 to control the display of the media and provide feedback.

In optional step 606, the media may be displayed in full a first time without the playback controls being enabled in order to obtain one-dimensional feedback. During this first playback, only one interactive indicator may be displayed, such as a "like/dislike" slider. If step 606 is performed, the media is restarted in step 608 to obtain the multi-dimensional feedback.

In step 610, the media is optionally stopped or paused to collect multi-dimensional feedback. The multi-dimensional feedback is collected using one or more interactive indicators. The interactive indicator may comprise a graphic such as a slider or a dial that is capable of receiving substantially continuous data. Alternatively, the interactive indicator may comprise a numerical input, a series of radio buttons, or other discrete indicators. The interactive indicators may be controlled by an analog or digital input device such as a mouse, joystick, keyboard, or the like. In step 612, after feedback has been received, the participant interface continues to play the media automatically or in response to an input by the survey participant 108.

In step 614, a determination is made whether to stop the display again to collect additional data before determining if the media play should continue in step 616. The display of the media may be stopped and restarted multiple times during the display of the media in response to a playback control received from a survey participant 108. In other embodiments, the survey may be set-up by the media provider 102 or the media analysis server 104 to stop at specified times during the display of the media to collect feedback about particular sections.

In step 618, after the display of the media and the collection of the feedback are complete, the feedback is transmitted to the data aggregator engine 216. In alternative embodiments, the feedback may be transmitted continuously during the survey. The feedback, such as ratings collected substantially continuously, may be quantified at the survey participant 108 prior to transmission.

Figure 7:
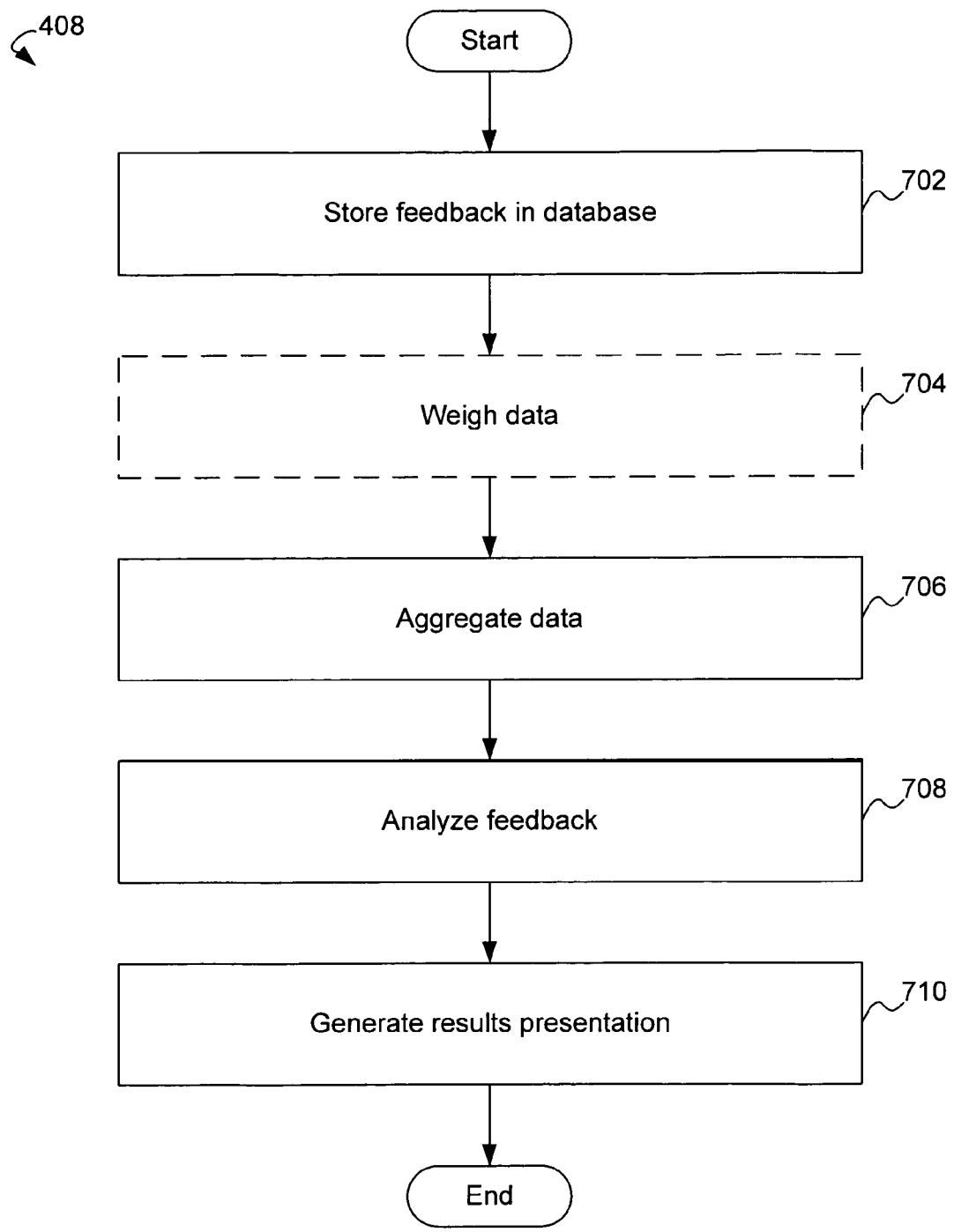
FIG. 7 depicts a flowchart of a method for processing the feedback received during a survey according to various embodiments of the invention.

Referring now to FIG. 7, a flowchart 408 of an exemplary process used to process the feedback received during a survey is shown. The process is performed to compile written comments and calculate an analysis of the feedback received from at least one survey participant 108. In some embodiments, the feedback received comprises time of the feedback submission, at least one dimension, and a quantified rating.

In step 702, the feedback received from the survey participants 108 may be stored in the media analysis database 214. The feedback may be stored until a certain number of survey participants 108 have provided feedback or until a specified time period has passed. The feedback then is aggregated in the data aggregator engine 216. As discussed herein, the data aggregator engine 216 may monitor the demographic, attitudinal, or behavioral profiles of the responding survey participants and instruct the user module 202 to send additional invitations to participate in the survey or to send survey termination messages according to the demographic, attitudinal, or behavioral profile of the users.

In some embodiments, the data aggregator engine 216 weights feedback received from at least one survey participant 108 in optional step 704. The weighting is performed to allow the feedback to be interpreted correctly as being representative of the target population.

In step 706, the data aggregator engine 216 and/or the data analysis module 306 aggregates the data received from more than one survey participant 108. The data aggregation may include, for example, assigning continuous time data to a time interval, such as averaging over each one second interval. Other feedback collected from the survey participants (e.g., survey participants 108) during the time interval may be added to the time interval to consolidate the feedback received from multiple survey participants 108 according to the time of the feedback. Open-ended comments, if collected, may also be added to a time interval.

Additionally, the data aggregator engine 216 may quantify the ratings received from the survey participants 108a and 108b depending on the type of participant input received. The quantified ratings may then be accessed by the data analysis module 306.

In step 708, the data analysis module 306 in the analyzer engine 204 accesses the feedback to analyze the feedback. The quantified ratings may be statistically processed to determine, for example, an average, a median, a mode, a standard deviation, a rate of change, a maximum rating, and/or a minimum rating during a particular time interval or within a particular dimension. The ratings and/or statistical results may be included in the presentation.

In step 710, the data analysis module 306 generates the results presentation. The results presentation may include animated bars indicating the quantified ratings, open-ended comments received, and/or results of a statistical analysis. In exemplary embodiments, the results presentation includes a display of the media.

Figure 8:
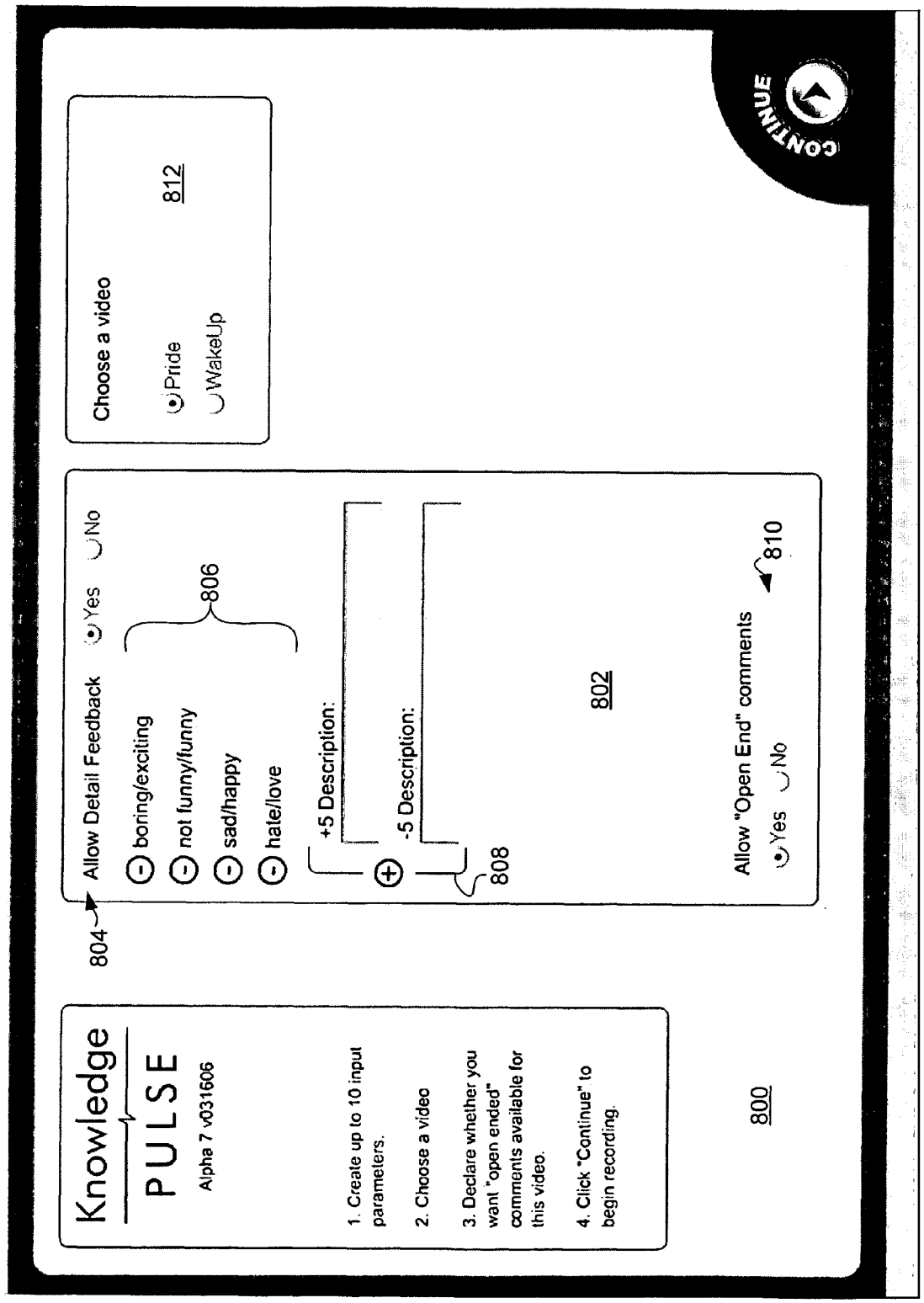
FIG. 8 is an exemplary set-up screen image.

FIG. 8 is an exemplary set-up screen image 800 provided, in some embodiments, by the media set-up module 302 to set-up a survey. This screen image 800 may appear at the media provider 102 device or at an interface of the media analysis server 104. The set-up screen image 800 comprises a dimensions menu 802 and a video menu 812.

The dimensions menu 802, as shown, includes an option 804 to allow detailed feedback in the survey. If the operator selects "yes," a selection menu 806 comprising various default dimensions is activated. The default dimensions may be categorized by type of media or by frequently used dimensions. The operator is able to select one or more dimensions listed in the selection menu 806 to be included in the survey. The operator may be limited to selecting only a specified number of dimensions per survey. For example, up to ten dimensions may be selected.

The dimensions menu 802 further comprises an add option 808. The add option 808 allows the operator to input additional dimensions not listed in the selection menu 806. For example, a positive ("+5") description to be added may be "beautiful" and the corresponding ("−5") negative description may be "ugly." Thus, a beautiful/ugly dimension is added to the dimensions menu 806. In this embodiment, the dimensions comprise bipolar rating scales. Other scales that may be used will be apparent to those skilled in the art.

In this example, the dimensions menu 802 further includes a comments option 810. The comments option 810, when "yes" is selected, allows the survey participants 108 to input open-ended comments during a survey. The open-ended comments need not be relevant to the dimensions selected in the menu 806.

The set-up screen image 800 further comprises the media menu 812. The media menu 812 displays titles of media that may be included in the survey. The media may be stored in the media database 212. The survey may comprise displaying one or more media to the survey participants 108. In one embodiment, the media is a full motion video with an audio track.

It should be noted that the set-up screen image 800 is one embodiment of a set-up graphical operator interface (GUI). The set-up GUI may include more or less options depending on the embodiment implemented. The set-up GUI may comprise, for example, a menu to select a profile of survey participants 108 to be surveyed. Additionally, the set-up GUI may comprise additional menus for display options, such as a general feedback mode for continuous one-dimensional feedback collection or to select one or more stop points to elicit feedback about specific sections of the media.

Figure 9:
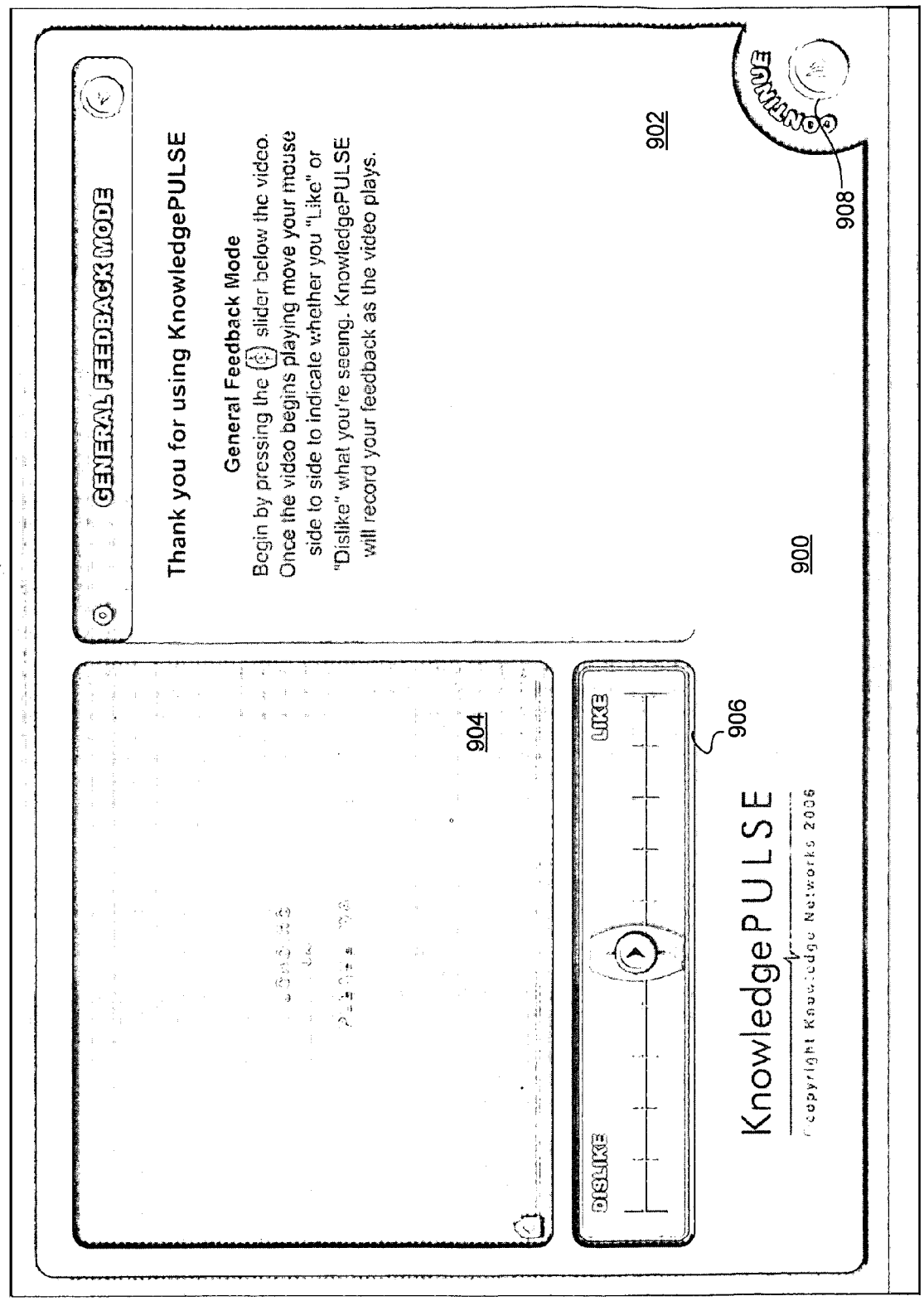
FIG. 9 is an exemplary general feedback mode screen image.

FIG. 9 is a sample general feedback mode screen image 900 displayed to a survey participant 108. The general feedback mode comprises a first playback of the media during which the survey participant 108 is only allowed to provide feedback along one dimension. The survey participant 108 may not be able to control playback during this mode. The general feedback mode screen image 900 comprises an instruction display 902, a media display 904, an interactive indicator 906, and a continue button 908.

The instruction display 902 comprises text and/or graphical instructions for the survey participants 108. These instructions may be modified depending on the dimension measured in the general feedback mode. For example, if the media comprises a political speech, the instruction window may instruct the survey participant to indicate whether the speech is "credible" or "not credible" rather than whether the survey participant 108 "like[s]" or "dislike[s]" the video. The media display 904 is an area of the participant interface in which the media or video is displayed.

In the depicted embodiment, the interactive indicator 906 comprises a slider that may be moved along a line from "dislike" to "like" by the survey participant 108. In other embodiments, the interactive indicator 906 may comprise a dial, a knob, a set of radio buttons, a numerical input, or the like. The interactive indicator 906 allows a user to input a quantifiable rating based on, for example, a position on the slider. The interactive indicator is further coordinated with a timer or clock associated with the media such that the rating includes a time of the feedback. When the first playback of the media is complete, the survey participant 108 may click or otherwise trigger the continue indicator 908 to progress to a detailed feedback mode.

Figure 10:
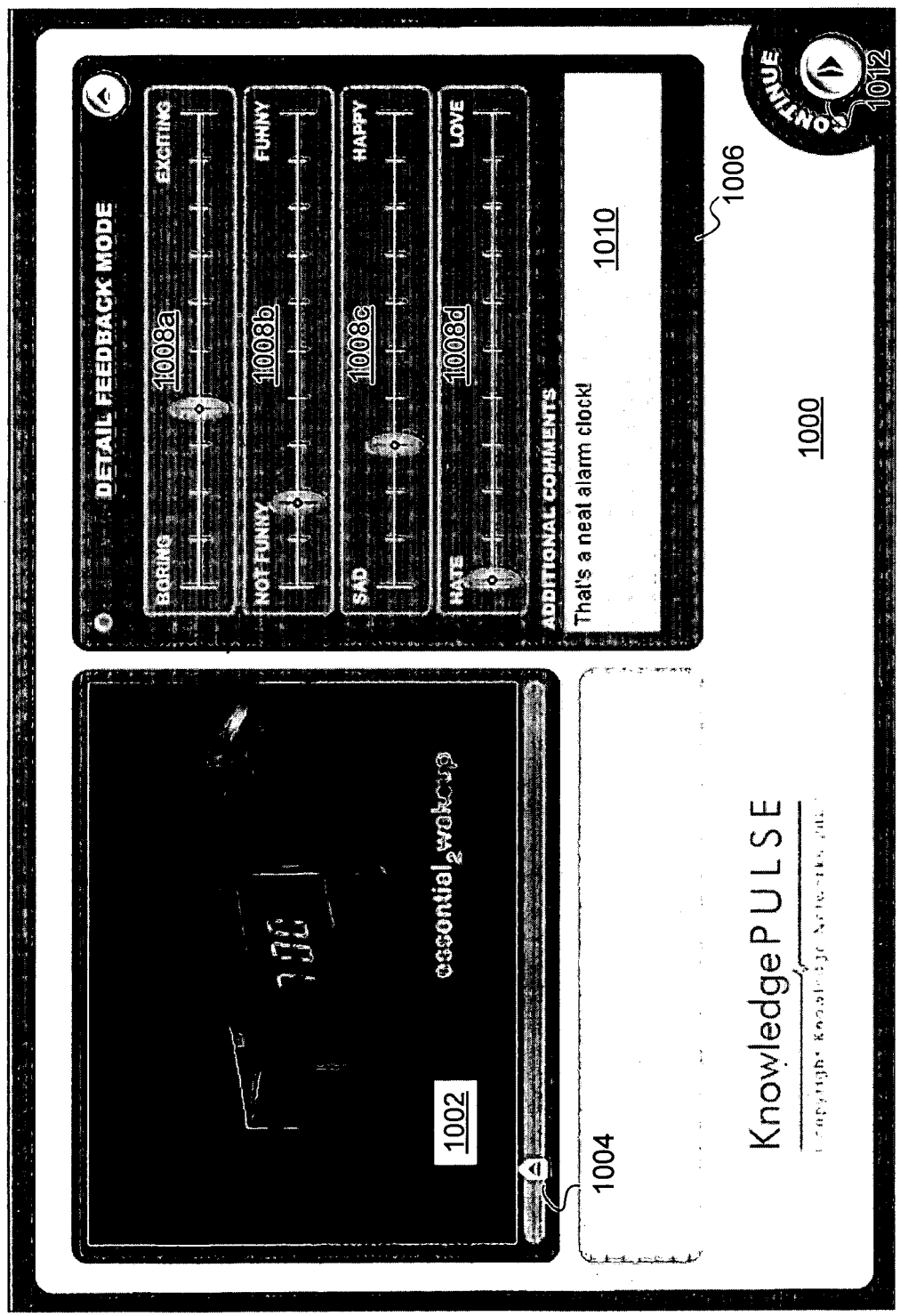
FIG. 10 is an exemplary detailed feedback mode screen image.

Referring now to FIG. 10, a sample detailed feedback mode screen image 1000 is shown. In the detailed feedback mode, the survey participant 108 provides ratings along one or more dimensions specified during the survey set-up step 402. The detailed feedback mode graphical user interface (GUI) comprises a media display 1002, a playback control 1004, a dimensions window 1006, one or more interactive indicators 1008*a-d*, a comments field 1010, and a continue indicator 1012.

During the survey, the media is displayed in the media display 1002. The display of the media may be controlled using the playback control 1004. The playback control 1004 is an interactive element that is used by the survey participant 108 to stop, pause, resume, rewind, and/or fast forward the display of the media. The playback control 1004 is depicted as a slider along the bottom of the media display 1002. In other embodiments, the playback control may comprise separate buttons, such as a play button and a stop button.

When the survey participant 108 stops the display of the media or when the media provider 102 has specified that the media be stopped, the dimensions window 1006 is triggered. The dimensions window comprises one or more interactive indicators 1008*a-d* and a comments field 1010. In the embodiment of FIG. 10, for example, five interactive indicators 1008*a-d* are shown. For example, interactive indicator 1008*a* receives ratings along a "boring/exciting" dimension; interactive indicator 1008*b* receives ratings along a "hate/love" dimension; interactive indicator 1008*c* receives ratings along a "not funny/funny" dimension; and interactive indicator 1008*d* receives ratings along a "sad/happy" dimension. The interactive indicators 1008*a-d* may measure along other bipolar or non-bipolar dimensions and/or appear as a dial, bar, or other interactive indicator capable of receiving quantifiable data.

The comments field 1010 is able to receive alphanumeric data from a keyboard, stylus, or other input device. The comments field 1010 may include text formatting features, and/or a time indicating a time of the media. The comments field 1010 may be optional or not included in some embodiments of the present invention.

The continue indicator 1012 may be used by the survey participants 108 to indicate when they have finished providing feedback and/or completed the survey. When the continue indicator 1012 is selected or otherwise triggered, the survey may continue to display the media or progress to a completion screen.

Figure 11:
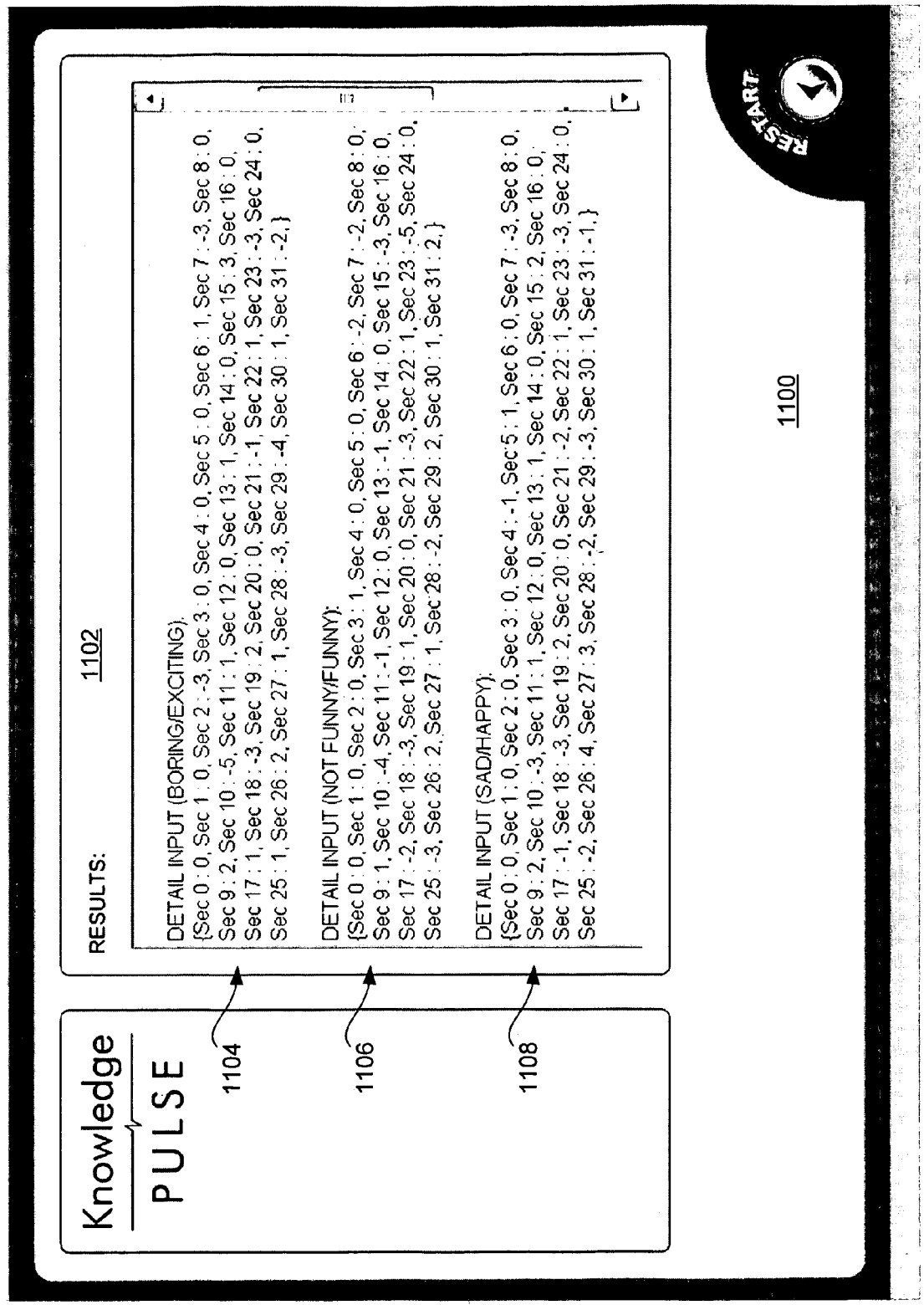
FIG. 11 is an exemplary screen image of raw data.

FIG. 11 is a sample raw data screen image 1100 according to some embodiments of the invention. This screen image 1100 may be presented to the media provider 102 in some embodiments. The sample raw data screen image 1100 comprises a results window 1102. For simplicity, only a portion of the raw data is shown. The results window 1102 comprises a list of the dimensions measured and/or the comments provided. As shown, the feedback provided is listed according to dimension then by the time of the media. For example, feedback 1104 for the dimension "boring/exciting" comprises each second of the media followed by a quantified rating. Likewise feedback 1106 and 1108 for the dimensions "not funny/funny" and "sad/happy" include both the time of the media and the quantified rating.

Figure 12:
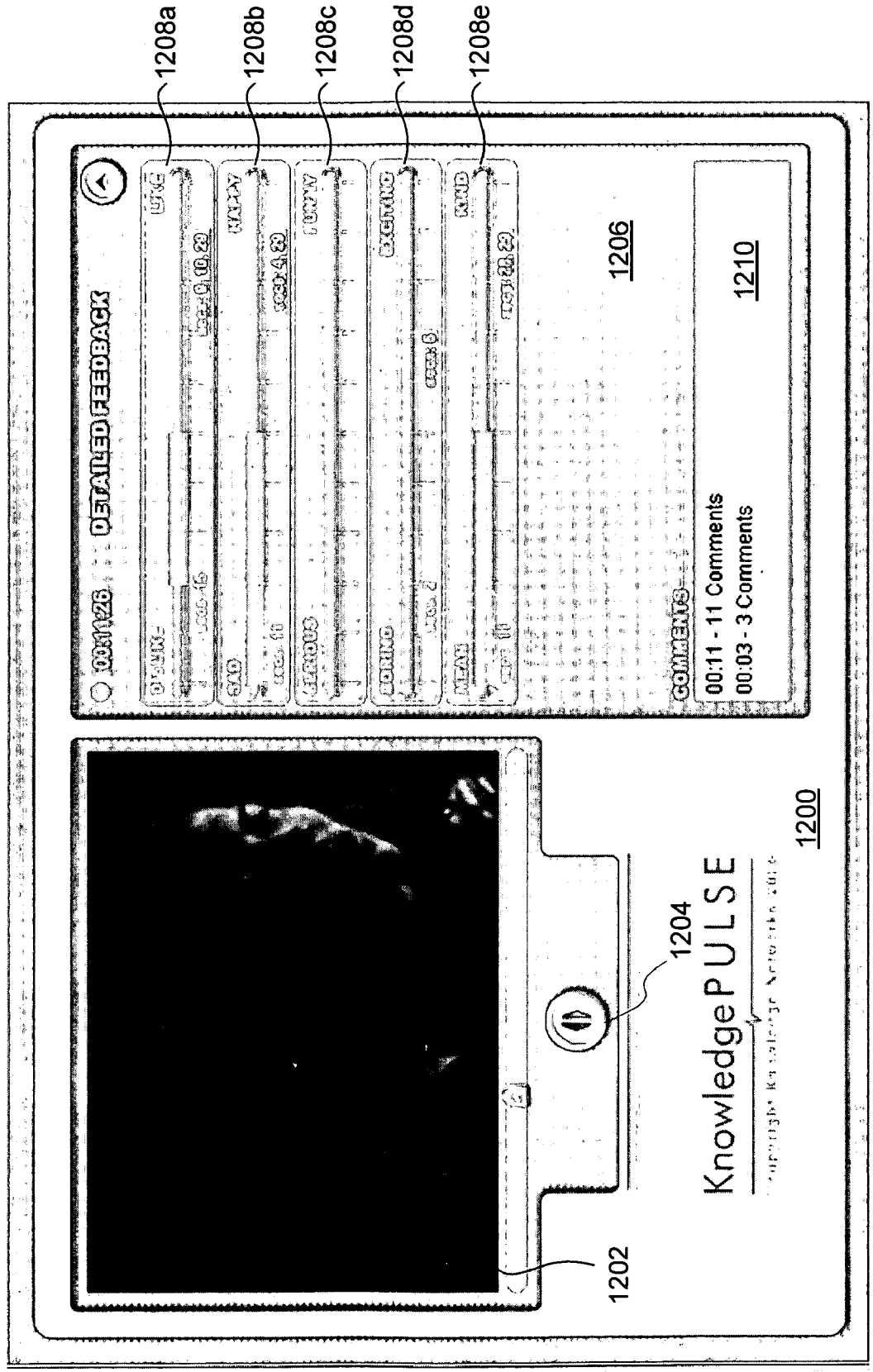
FIG. 12 is an exemplary results mode screen image.

FIG. 12 is a sample results mode screen image 1200. The results mode screen image 1200 displays the results presentation to the media provider 102. The results presentation comprises displaying the media synchronously with the feedback received from one or more survey participants 108. This allows a viewer, such as the media provider 102, to view the feedback results in a visual and temporal context of the media. The results mode screen image 1200 comprises a media display 1202, a playback control 1204, and a dimensions display 1206 comprising one or more ratings displays 1208a-e and a comments display 1210.

The media display 1202 displays the media that was displayed during the survey to the survey participants 108. The media display 1202 includes a playback control 1204. The playback control 1204 may include options to stop, pause, play, rewind, fast forward, or change the speed of the display. In other embodiments, the playback control 1204 may appear as a series of buttons on the screen.

During the display of the media, the dimensions display 1206 synchronously displays the feedback in a graphical format. The ratings displays 1208a-e may comprise sliders, bars, or other dynamic elements to indicate values resulting from the statistical analysis of the feedback. The ratings are displayed according to the dimensions. For example, the ratings display 1208a indicates ratings from the general feedback mode in which the dimension measured is "like/dislike." The other ratings displays 1208b-e indicate ratings related to dimensions that are included in the detailed feedback mode. For example ratings display 1208b indicates ratings related to the "sad/happy" dimension; ratings display 1208c indicates ratings related to the "serious/funny" dimension; ratings display 1208d indicates ratings related to the "boring/exciting" dimension; and ratings display 1208e indicates ratings related to the "mean/kind" dimension.

The comments display 1210 comprises a list of times of the media followed by a count of the comments left at those times. To view the comments written by the survey participants 108, an operator at the media provider 102 may click on the time or otherwise trigger a text display (not shown). Alternatively, if the "open-ended comments" option is not allowed during set-up, the comments display 1210 does not appear in the results presentation.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A system for receiving multi-dimensional feedback in a survey, the system comprising:
    a participant interface module stored at a computing device, wherein the participant interface module is executed to generate a display of a media to at least one participant, the media display including a plurality of interactive indicators configured to collect feedback and a time of the feedback from the at least one participant, the feedback being collected during display of the media and based on two or more dimensions; and
    a data analysis module stored at the computing device, wherein the data analysis module is executed to:
        process the feedback and time of the feedback collected by the participant interface module during display of the media, and
        generate a graphical display of the processed feedback, wherein the graphical display is displayed during display of the media, the graphical display of the processed feedback including the two or more dimensions and the time of the feedback.

2. The system of claim 1 further comprising a media set-up module executable to provide a graphical user interface to receive input from an operator, the input specifying the two or more dimensions.

3. The system of claim 2 further comprising a participant database configured to store at least one demographic, attitudinal, or behavioral profile associated with the at least one participant.

4. The system of claim 1 further comprising a media database configured to store at least one version of the media.

5. The system of claim 1 further comprising a data aggregator engine executable to aggregate data according to the two or more dimensions.

6. The system of claim 1 wherein an interactive indicator of the plurality of interactive indicators comprises a slider.

7. The system of claim 1 wherein an interactive indicator of the plurality of interactive indicators comprises a dial.

8. The system of claim 1 further comprising a media analysis database configured to store the processed feedback.

9. The system of claim 1 further comprising a user module executable to set-up and maintain a user profile.

10. A method for receiving multi-dimensional feedback in a survey, the method comprising:
    generating a display of a media to at least one participant, the media display including a plurality of interactive indicators for collecting feedback and a time of the feedback from at least one participant, the feedback being collected during display of the media and based on two or more dimensions;
    receiving feedback and the time of the feedback collected from the at least one participant via the plurality of interactive indicators; and
    executing instructions stored at a computing device, wherein execution of the instructions by the computing device:

processes the feedback received from the at least one participant, and displays the processed feedback during display of the media, the display of the processed feedback including the two or more dimensions and the time of the feedback.

11. The method of claim 10 further comprising displaying a first continuous playback of the media prior to generating the media display including the plurality of interactive indicators.

12. The method of claim 10 further comprising weighing the feedback received from the at least one participant.

13. The method of claim 10 further comprising choosing the at least one participant and sending an invitation to the at least one chosen participant.

14. The method of claim 10 further comprising selecting the two or more dimensions and a demographic profile of the at least one participant.

15. The method of claim 10 wherein the display of the processed feedback includes a quantifiable rating using the two or more dimensions associated with the interactive indicators.

16. The method of claim 10 further comprising aggregating the feedback received from the at least one participant.

17. The method of claim 10 wherein receiving feedback includes receiving one or more open-ended comments from the at least one participant, each open-ended comment associated with a particular time of the feedback.

18. A machine-readable storage medium having embodied thereon a program, wherein the program is executed by a computing device to perform a method for providing multi-dimensional feedback, the method comprising:

generating a display of a media to at least one participant, the media display including a plurality of interactive indicators to collect feedback and a time of the feedback from the at least one participant, the feedback being collected during display of the media and based on two or more dimensions;

receiving feedback and the time of the feedback from the at least one participant via the plurality of interactive indicators;

processing the feedback received from the at least one participant; and displaying the processed feedback during display of the media, the display of the processed feedback including the two or more dimensions and the time of the feedback.

19. The machine readable medium of claim 18 wherein the method further comprises specifying the two or more dimensions based on operator input.

20. The machine readable medium of claim 18 wherein the method further comprises selecting the media to display to the participant.

* * * * *